C. H. McKENDREE.
RIM.
APPLICATION FILED FEB. 4, 1920.

1,362,430.

Patented Dec. 14, 1920.

WITNESSES
E. A. Wilson
S. W. Foster

INVENTOR
C. H. McKendree
BY
Munn & Co
ATTORNEYS

UNITED STATES PATENT OFFICE.

CREED HAYMAN McKENDREE, OF LAKEVIEW, OREGON.

RIM.

1,362,430.   Specification of Letters Patent.   Patented Dec. 14, 1920.

Application filed February 4, 1920. Serial No. 356,191.

*To all whom it may concern:*

Be it known that I, CREED H. MCKENDREE, a citizen of the United States, and a resident of Lakeview, in the county of Lake and State of Oregon, have invented a new and Improved Rim, of which the following is a full, clear, and exact description.

This invention relates to improvements in rims, and more particularly to rims for supporting pneumatic tires on wheel fellies, an object of the invention being to provide a rim which is contracted by the expansion of air in the tire when the latter is inflated so as to cause the rim to firmly grip the wheel.

A further object is to provide a rim of circular form having its ends slightly spaced apart to allow for expansion and contraction of the rim, said rim adapted to be contracted by the inflation of the tire, the pressure of air in the tire causing a contraction of the rim.

A further object is to provide a rim which can be conveniently connected to or disconnected from a wheel so that it is readily demountable, and provide improved devices in connection with the rim for holding the same expanded to facilitate the removal and replacement of the rim.

With these and other objects in view the invention consists in certain novel features of construction, and combinations and arrangements of parts, as will be more fully hereinafter described and pointed out in the claim.

In the accompanying drawings—

1 represents a shoe and 2 an inner inflated tube forming a pneumatic tire of the ordinary type which is supported by my improved rim 3, the latter positioned around the felly 4 of the wheel 5. The rim 3 is made with comparatively straight or slightly curved flanges 6 to inclose the inner portion of the shoe and these flanges are preferably of the type shown rather than the ordinary clencher type which would render it difficult to remove the shoe as the rim is circular in form.

Figure 1:
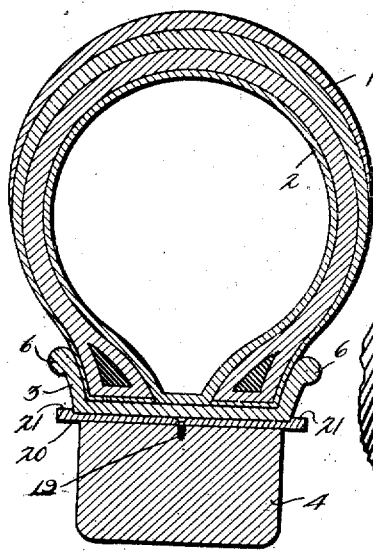
Figure 1 is a view in transverse section through a tire, rim and wheel felly illustrating my invention.
Figure 2:
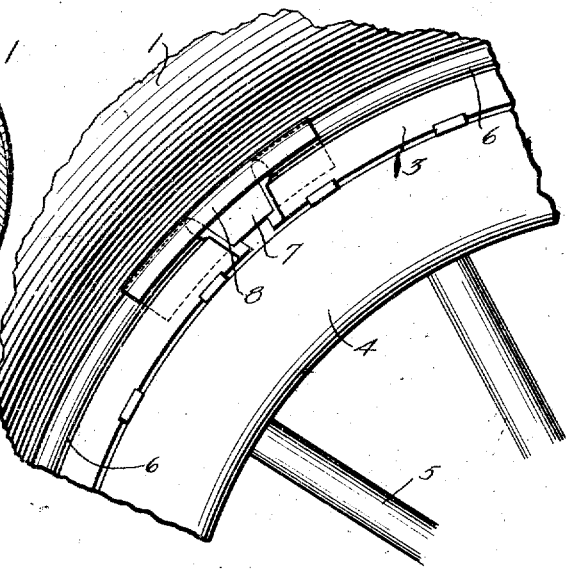
Fig. 2 is a fragmentary view in side elevation.
Figure 5:
Fig. 5 is a view in section on the line 5—5 of Fig. 4.
Figure 3:
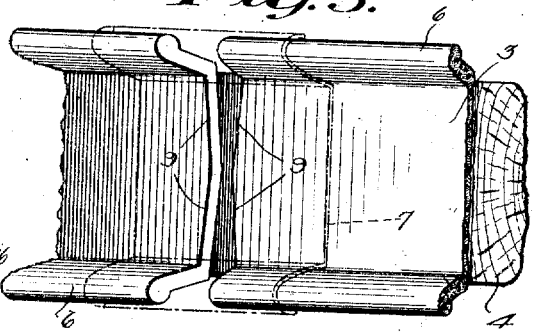
Fig. 3 is a fragmentary perspective view showing the adjacent ends of the rim and the dotted line indicating the position of the bridge piece.
Figure 4:
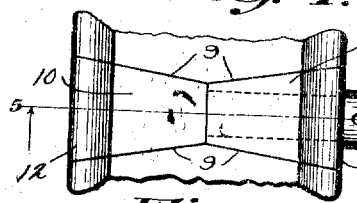
Fig. 4 is a fragmentary plan view showing the rim in expanded position.
Figure 6:
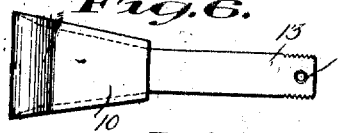
Fig. 6 is a view in elevation of one of the wedge members.
Figure 7:
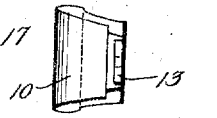
Fig. 7 is an end view of Fig. 6.
Figure 10:
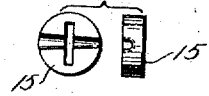
Fig. 10 illustrates the washer 15 in front elevation and edge view.
Figure 8:
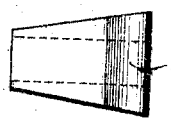
Fig. 8 is a view in elevation of the other wedge member.
Figure 9:
Fig. 9 is an end view of Fig. 8.
Figure 11:
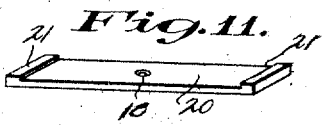
Fig. 11 is a perspective view of one of the spacing plates 20.

My improved rim 3, while comprising in effect a complete ring or circle, does not, as a matter of fact, constitute a complete annular ring, but is in reality a channel bent in circular form with the ends of the channel slightly apart, as shown clearly in Figs. 3 and 4.

When the rim is in use a bridge piece 7 is employed which conforms in transverse shape to the shape of the rim and bridges the gap between the ends of the rim and is made with overlapping flanges 8 at its edges projecting over the flanges 6 of the rim. This bridge piece 7 is of relatively thin metal and provides a smooth bearing for the tire and prevents possibility of pinching the same between the ends of the rim.

I would call particular attention to Fig. 4 which illustrates in plan the adjacent ends of the rim, and it will be noted that these ends are beveled or tapered from their transverse centers to their outer edges as indicated at 9 so that they receive wedge pieces 10 and 11 which fit the space between the ends of the rim. These wedge pieces 10 and 11 have flanges 12 at their outer ends conforming in shape to the shape of the flanges 6 of the rim and they are made in the form of wedges longitudinally so that they can be readily forced into position between the ends of the rim to expand the rim and allow the rim to be easily removed from the felly 4. The member 10 is made with a tongue 13 which is projected through a longitudinal bore 14 of member 11 and through a washer 15, and a cross pin 16 is positioned transversely through an opening 17 in the end of tongue 13 and located against the washer 15 to hold the members 10 and 11 in proper position between the ends of the rim.

Between the rim 3 and the felly 4 a circular series of transversely positioned plates 20 may be located, said plates having openings 18 between their ends for the reception of screws or other securing devices 19 to secure the same to the felly 4, and said plates have flanges 21 at their ends which slightly overlap the outer faces of the rim to prevent accidental lateral movement of the rim. These flanges 21 are relatively shallow so that the expansion and contraction of the rim is ample to vary the diameter of the rim in order to remove the rim or to securely clamp the plates.

In operation, the deflated tire is located around the rim and the wedge pieces 10 and 11 are located between the ends of the rim to hold the rim expanded, thus permitting the rim to be readily positioned over the wheel felly and over the flanges 21 of the plates 20. When the rim is in position on the felly, the wedge pieces 10 and 11 are removed, it being understood, of course, that the bridge piece 7 is previously located across the adjacent ends of the rim to support the tire. After the wedge pieces 10 and 11 are removed, the tire is inflated and this inflation of the tire due to the expansion thereof as a result of the air pressure within the tire, causes the contraction of the rim 3 so that it is drawn tightly around the felly and grips the plates 20, the flanges 21 at the ends of the plates preventing possibility of lateral displacement of the rim. When the rim is to be removed, the tire is deflated and the wedge pieces 10 and 11 forced into position between the ends of the rim and secured by means of the washer 15 and pin 16 so as to hold the rim sufficiently expanded to permit its convenient removal from the felly.

Various slight changes may be made in the general form and arrangement of parts described without departing from the invention, and hence I do not limit myself to the precise details set forth, but consider myself at liberty to make such changes and alterations as fairly fall within the spirit and cope of the appended claim.

I claim:

A rim, comprising a channel of circular form having its ends spaced apart, said ends of the rim beveled or tapered from the center of the rim to the outer edges, wedge members fitting the tapers of the ends and projecting to the center of the rim, said wedge members operating to expand the rim, one of said wedge members having an opening therein, a tongue on the other wedge member projecting through said opening, and devices on the end of the tongue securing the wedge members together.

CREED HAYMAN McKENDREE.